(12) United States Patent
Forster et al.

(10) Patent No.: US 11,267,073 B2
(45) Date of Patent: Mar. 8, 2022

(54) GUIDANCE OF A CUTTING HEAD IN RELATION TO A MATERIAL BY USING SENSOR DELAY TIME

(71) Applicant: Siemens Aktiengesellschaft, Munich (DE)

(72) Inventors: Gerhard Forster, Schwarzenbruck (DE); Klaus Geissdörfer, Erlangen (DE); Carsten Hamm, Eggolsheim (DE); Elmar Schäfers, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/272,100

(22) PCT Filed: Aug. 16, 2019

(86) PCT No.: PCT/EP2019/072033
§ 371 (c)(1),
(2) Date: Feb. 26, 2021

(87) PCT Pub. No.: WO2020/043513
PCT Pub. Date: Mar. 5, 2020

(65) Prior Publication Data
US 2021/0316393 A1    Oct. 14, 2021

(30) Foreign Application Priority Data

Aug. 27, 2018   (EP) .................................... 18190891

(51) Int. Cl.
*B23K 26/04* (2014.01)
*B23K 26/38* (2014.01)
(Continued)

(52) U.S. Cl.
CPC ............ *B23K 26/048* (2013.01); *B23K 26/38* (2013.01); *B26D 5/005* (2013.01); *G05B 19/19* (2013.01); *G05B 2219/45044* (2013.01)

(58) Field of Classification Search
None
See application file for complete search history.

(56) References Cited

U.S. PATENT DOCUMENTS

2008/0040940 A1 * 2/2008 Schmall ............... B23Q 16/005
                                                                33/638
2009/0139970 A1 * 6/2009 Grupp ................ B23K 37/0229
                                                                219/137 R (Continued)

FOREIGN PATENT DOCUMENTS

CN      104423321 A    11/2006
CN      202058007 U    11/2011
(Continued)

OTHER PUBLICATIONS

Albrech et al. 'High frequency bandwidth cutting force measurement in milling using capacitance displacement sensors' International Journal of Machine Tools & Manufacture 45 (2005) 993-1008.*

(Continued)

*Primary Examiner* — Bernard G Lindsay
(74) *Attorney, Agent, or Firm* — Henry M. Feiereisen LLC (57) ABSTRACT

In a method for guiding a cutting head in relation to a material, a position and a speed of the cutting head are set by means of a drive unit depending on a desired position value and a desired speed value established by an interpolator unit, a control signal for the drive unit is determined, a distance between the cutting head and the material is determined with a distance sensor, and a corresponding distance signal is provided. The distance signal is compared (Continued)

with a predetermined comparison distance to yield a distance-control signal, and the control signal for the drive unit is additionally determined dependent upon a distance-control signal. The comparison distance is subtracted from the distance signal and the difference is superimposed on the actual position signal, which is delayed by a first time period, wherefrom the distance-control signal is determined.

9 Claims, 2 Drawing Sheets

(51) Int. Cl.
    *B26D 5/00*     (2006.01)
    *G05B 19/19*     (2006.01)

(56) References Cited

U.S. PATENT DOCUMENTS

| | | |
|---|---|---|
| 2011/0287692 A1 | 11/2011 | Erichsen et al. |
| 2013/0025422 A1 | 1/2013 | Chillman et al. |
| 2013/0103183 A1* | 4/2013 | Mochida ............... G05B 19/19 |
| | | 700/186 |
| 2013/0178953 A1* | 7/2013 | Wersborg ............... G06N 3/006 |
| | | 700/48 |
| 2013/0320908 A1 | 12/2013 | Iwashita et al. |
| 2014/0138363 A1* | 5/2014 | Hammann ............ B23K 26/38 |
| | | 219/121.78 |
| 2014/0170935 A1 | 6/2014 | Maurer |
| 2015/0057955 A1 | 2/2015 | Eguchi |
| 2018/0056443 A1 | 3/2018 | Kramer et al. |
| 2018/0241376 A1 | 8/2018 | Geissdorfer et al. |

FOREIGN PATENT DOCUMENTS

| | | |
|---|---|---|
| CN | 103454961 A | 12/2013 |
| JP | 2006321033 A | 11/2006 |
| JP | 2010049599 A | 3/2010 |

OTHER PUBLICATIONS

PCT International Search Report and Written Opinion of International Searching Authority dated May 11, 2019 corresponding to PCT International Application No. PCT/EP 2019/072033 filed Aug. 16, 2019.

* cited by examiner

GUIDANCE OF A CUTTING HEAD IN RELATION TO A MATERIAL BY USING SENSOR DELAY TIME

CROSS-REFERENCES TO RELATED APPLICATIONS

This application is the U.S. National Stage of International Application No. PCT/EP2019/072033, filed Aug. 16, 2019, which designated the United States and has been published as International Publication No. WO 2020/043513 A1.

BACKGROUND OF THE INVENTION

The invention relates to a method for guiding a cutting head in relation to a material, wherein by means of a cutting process carried out by the cutting head, a cut is made due to a relative movement of the cutting head in relation to the material, wherein at least one position setpoint value and at least one speed setpoint value for guiding the cutting head are provided by an interpolator unit, a position and a speed of the cutting head in relation to the material are set by means of a drive unit dependent upon the position setpoint value and the speed setpoint value in that a setpoint location signal is determined from the position setpoint value, an actual location signal provided by the drive unit is compared with the setpoint location signal in the context of a first comparison and a control signal is determined for the drive unit dependent upon the first comparison and the speed setpoint value, wherein a distance between the cutting head and the material is detected by means of a distance sensor and a corresponding distance signal is provided, the distance signal is compared with a pre-determined comparison distance in the context of a second comparison and, dependent upon the second comparison, a distance control signal is determined, and the control signal is determined, in addition, dependent upon the distance control signal. The invention also relates to a computer program product. Lastly, the invention also relates to a control facility for guiding a cutting head in relation to a material, in order to make a cut in the material by means of a cutting process carried out by the cutting head due to a relative movement of the cutting head in relation to the material, wherein the control system is configured to detect at least one position setpoint value and at least one speed setpoint value that are provided by an interpolator unit for guiding the cutting head, to provide a control signal for a drive unit, dependent upon the position setpoint value and the speed setpoint value, in order to set a position, which can also comprise an orientation, and a speed of the cutting head in relation to the material, for which purpose the control facility is configured to determine a setpoint location signal from the position setpoint value, to compare an actual to signal provided by the drive unit with the setpoint location signal in the context of a first comparison and to determine the control signal for the drive unit dependent upon the first comparison and the speed set point value, to detect a distance signal provided by means of a distance sensor, said distance sensor detecting a distance between the cutting head and the material, to compare the distance signal with a pre-determined comparison distance in the context of a second comparison and, dependent upon the second comparison, to determine a distance control signal, and to determine the setpoint location signal, in addition, dependent upon the distance control signal.

Methods, control facilities and also computer program products of the aforementioned type are extensively known in the prior art, so that separate documentary evidence for these are not needed. These are often used for laser cutting, water jet cutting and/or the like. Not only for laser cutting, but also other cutting methods, in particular, in the laser cutting of metal sheets, the most accurate possible distance control between the cutting head and the material, for example, the metal sheet is needed since the maintenance of the distance between the cutting head and the material is important for a proper cuffing process. This applies, in particular, in the event that the material, for example, the metal sheet is not flat but, for example, hangs between support points, or the like. It is therefore usual to track the cutting head or the metal sheet or even both by means of at least one suitable drive facility in order to be able to realize a pre-determined distance for the cutting process.

In order to be able to maintain a pre-determined distance between the material and the cutting head during the cutting process, it is usual to provide a capacitive distance sensor. Although the use of the capacitive distance sensor has proved useful, it has been found to be disadvantageous that after detecting a momentary distance, a certain timespan passes before the distance sensor provides an associated distance signal. From this arises the disadvantage that, as compared with a motor encoder which provides the actual location signal of the cutting head, a corresponding time delay occurs.

In addition, only an item of relative position information is provided by the distance sensor with the distance signal, specifically the detected distance. This proves to be particularly disadvantageous for a distance control that uses such a capacitive distance sensor. In addition, the aforementioned disadvantages have the effect that particularly with a sensor-guided approach of the cutting head to the material, a severe overshoot of the movement can occur.

It is an object of the invention to improve the guidance of the cutting head in relation to the material, in particular, in a sensor-guided approach.

SUMMARY OF THE INVENTION

As a solution, a method, a computer program product and a control facility according to the independent claims are proposed with the invention.

Advantageous developments are disclosed by the features of the dependent claims.

With regard to a method of this type, it is proposed in particular that in the context of the second comparison, the comparison distance is subtracted from the distance signal and a difference signal determined thereby is overlaid on the actual location signal delayed by a first timespan in order to determine the distance control signal, wherein the first timespan is dependent upon a delay time of the distance sensor, which the distance sensor needs in order to provide the corresponding distance signal for a detected distance.

With regard to a computer program product of this type, it is proposed, in particular, that it comprises a program for a computer unit with program code portions of the program for carrying out the steps of the method of the invention when the program is carried out by the computer unit, so that the computer unit determines a control signal.

With regard to a control facility of this type, it is proposed in particular that the control facility is configured, in the context of the second comparison, to subtract the comparison distance from the distance signal and thereby to overlay a difference signal on the actual location signal delayed by a first timespan in order to determine the distance control signal, wherein the first timespan is dependent upon a delay time of the distance sensor, which the distance sensor needs in order to provide the corresponding distance signal for a detected distance.

The invention proceeds from a distance control loop which uses a proportional amplification or gain (KV value) and which is overlaid on a normal axis control loop. Usually, in the prior art, the proportional amplification must be selected to be so small that even during approaching of the cutting head to the material, no excessive overshoot and, in particular, no collision of the cutting head with the material occurs. This naturally restricts a control dynamic, so that a sensor-guided approach process can be carried out only relatively slowly as compared with a normal positioning movement.

With the invention, the disadvantages of the prior art can be overcome in that a novel controller structure is provided which includes the axis actual position or the actual location value that is made available by the motor sensor, or motor encoder, in the distance control. So that a correspondingly reliable functionality can be ensured, the invention teaches that the axis actual position or the corresponding actual location signal is thereby taken into account time-delayed according to the first timespan. Thereby, the actual location signal and the distance signal of the distance sensor can be temporally synchronized so that a reliable functionality can be provided.

With this controller structure according to the invention, the distance control that is usual in the prior art no longer needs to be provided. At least, however, it no longer needs to be activated for the approach of the cutting head to the material. Rather, a distance control signal can be provided which supplies an absolute position of the material. This not only allows the sensor-guided approach of the cutting head to the metal sheet or vice versa, to be improved, but a significantly more stable control function can also be achieved with regard to the distance between the cutting head and the material. The overshooting typically occurring during a sensor-guided approach in the prior art can be significantly reduced by means of the invention. The guidance of the cutting head overall can hereby also be improved. Nevertheless, it can be provided that for an actual cutting process of the cutting procedure in which the cutting head is activated, in order to make the cut into the material in the pre-determined manner, the conventional distance control is still used.

The conventional distance control can provide that the control signal is thereby additionally determined dependent upon the distance control signal, in that the distance control signal is initially amplified, wherein from the amplified signal which can serve as an actuation signal for the distance controller, an additional setpoint value for the speed and, by integration of this signal, an additional setpoint value for the position can be determined, which are then used in addition for determining the control signal.

Furthermore, the invention also provides the possibility of switching over between the operating modes such as approach, travel during the cutting process and/or the like in a simple manner. Thus, during the cutting process, deviations from an ideal metal sheet geometry can be further compensated for while using the distance control. Nevertheless, the sensor-controlled movement of the cutting head can be used for the approach since, typically, no dynamic change in the location of the material should be expected. If the control according to the invention needs only be used for the approach, a greater amplification can be used in the distance control. The switch-over to conventional distance control can take place, in particular, continuously, but also for example, at pre-determined time points or positions.

The cutting head is a mechanical element by means of which the cuffing process in the material can be carried out. For this purpose, the cutting head can be configured, for example, as a laser cutting head, or also as a water jet cutting head or the like. However, the invention is not restricted to the use in such cutting heads, rather it can, in particular, also be used in any desired cutting heads. The cutting head carries out the cutting process by means of which the cut can be made in the material.

Even if the invention relates, in particular, to the cutting of metal sheet, the invention is however not restricted thereto and can in principle be used with almost any material for cutting. As the material, apart from metal sheet, another body that is to be cut and has a geometrical structure deviating from a plane can naturally be used. Furthermore, the body can have almost any desired contours, in particular, it can also have different thicknesses at different positions as required. Apart from metal, the material to be cut can also be plastics, ceramic, composite materials and/or the like.

The guidance of the cutting head relative to the material relates, in particular, to moving the cutting head relative to the material into a pre-determined position and, in particular, to moving the cutting head relative to the material during the cutting process. It can thereby be provided that not only the cutting head is moved by means of a drive unit, but it can also be provided that the material itself is moved relative to a cutting head. Naturally, these embodiments can also be combined with one another.

The interpolator unit is an apparatus by means of which the cutting head is guided in a suitable manner for carrying out the cutting process. For this purpose, the interpolator unit specifies at least one position setpoint value and at least one speed setpoint value that are used for guiding the cutting head. It is often provided that the interpolator unit specifies a sequence of corresponding position setpoint values and/or speed setpoint values, for example, according to the course of the cut or the like to be made in the material. In addition, such position setpoint values and/or speed setpoint values can also be provided for the sensor-guided approach of the cutting head in relation to the material. The interpolator unit serves to be able to carry out a specified cutting procedure on the material by means of the cutting head. At least the position setpoint value, the speed setpoint value and the comparison distance are signals. They can possibly each be realized for a pre-determined time period by means of a respective fixed signal value. In principle, if a signal has a substantially constant signal value for a pre-determinable time period, it provides this value within this time period. The expression "value" is accordingly therefore linked to the expression "signal".

The position and the speed of the cutting head in relation to the material can be set, by means of the drive unit, to be dependent upon at least one position setpoint value and/or at least one speed setpoint value. For this purpose, the drive unit can be an electric drive unit, a pneumatic drive unit, a hydraulic drive unit and/or the like. The drive unit can serve to move the cutting head in a desired manner. Furthermore, the drive unit can also serve to move the material in a desired manner. A combination thereof can also be provided.

For the setting of the position and the speed of the cutting head in relation to the material by means of the drive unit, a setpoint location signal is determined from the position setpoint value, which corresponds to a setting or a position of the cutting head. An actual location signal provided by the drive unit, which can be provided, for example, by the motor encoder or the like, is compared in the context of a first comparison with the setpoint location signal. Dependent upon the first comparison and the speed setpoint value, a control signal for the drive unit is determined.

For this purpose, it can be provided that a comparison signal of the first comparison is initially amplified in a suitable manner before the amplified signal is overlaid on the speed setpoint value. By this means, the axis control loop can be formed, by means of which the position and speed of the cutting head can be set. In principle, this can naturally also be provided for the material.

By means of the distance sensor, the distance between the cutting head and the material can be detected and a corresponding distance signal can be provided. For a respectively detected momentary distance, a distance signal corresponding to this detected distance is assigned as the corresponding distance signal. For the provision of the corresponding distance signal in respect of a respectively detected distance, the distance sensor requires the delay time which is usually a distance sensor-specific timespan. The distance sensor can be, for example, a capacitive distance sensor. Furthermore, the distance sensor can naturally also be an inductive distance sensor, an optical distance sensor, combinations thereof and/or the like. The distance sensor can be configured to detect the distance time-discretely, for example, at pre-defined time points, or the like. The distance signal is accordingly provided by the distance sensor.

The distance signal is compared with a pre-determined comparison distance in the context of a second comparison and, dependent upon the second comparison, a distance control signal is determined. The comparison distance or the setpoint distance can be provided by a separate distance unit. If needed, it can be selected adapted for the defined cutting process, and in particular, it can also be changed during the cutting process. This can be required, for example, if a thickness of the material changes during the cutting process or the like, for example, if for setting the most optimal possible cutting result, the distance between the cutting head and the material is to be adjusted, or the like.

The control signal for the drive unit is then determined, in addition, dependent upon the distance control signal. In the prior art, a distance control is realized at this site.

In order to avoid the disadvantages caused by the conventional distance control in the prior art, according to the invention, the comparison distance is subtracted from the distance signal of the distance sensor and the difference signal determined thereby is overlaid on the actual location signal delayed by a first timespan. The first timespan is dependent upon the delay time. The first timespan preferably corresponds to the delay time By this means, an absolute situation or position of the material or possibly also of the cutting head can be determined, on the basis of which, the further travel guidance can then be carried out. The distance control provided in the prior art thus need no longer be provided, so that in this regard, almost a pure control functionality is sufficient. The invention therefore begins with the determination of the distance control signal and takes into account that the first timespan is to be taken into account during the use of the actual location signal, By this means, a significantly more stable and faster guidance of the cutting head relative to the material can be achieved.

Overlaying includes, in particular, an addition functionality with which for example, two or more signals are added using signal technology by means of a suitable adding unit. Furthermore, however, the overlaying can also comprise, for example, a selection of the signal of at least two signals which has a largest amplitude value or the like. It can be provided that for the function of the overlaying, at least one of the signals is adapted or normalized in a suitable manner in order to realize the overlaying. The overlaying can, however, also comprise a weighting of at least one of the signals to be overlaid by means of one or more weighting factors which are used on the at least one of the signals to be overlaid, for example, by means of a multiplication function or the like. The overlaying can, however, also comprise a difference formation between signals. Overlaying can take place either numerically, for example, digitally or by analogue means. A combination thereof can also be provided. In relation to the overlaying of signals, in the context of this disclosure, a suitable signal processing is meant which has as its consequence the result provided by the overlaying. The signal processing can take place by analogue means, digitally or by a combination thereof.

The invention therefore provides a novel controller structure which includes in the distance control the axis actual position available from the motor encoder. By reason of the fact that in the invention, the first timespan of the distance sensor is known, the actual location signal delayed by exactly this time value can be used to determine the situation of the material, that is in particular, an absolute position of the material or the metal sheet. Thus, in conjunction with the motor encoder or the motor sensor, an absolute target position for the approach of the cutting head to the material, for example the metal sheet, can be used. Thereby, sufficiently rapid and precise algorithms for moving the cutting head or the material to an absolute target position can be made use of.

Through the determination of the first timespan as a definitive influence variable which can influence the different dynamic behavior of the distance sensors used and with its, for example computational, use in a computer program product (software), a dynamically independent target variable, specifically for example an absolute situation of the metal sheet can be determined which enables the previous purely regulation-based and therefore slow sensor-guided approach procedure to be replaced by a faster quasi-controlled approach procedure.

From this comes the result that the sensor-guided approach can be carried out faster, specifically largely avoiding overshoot. Furthermore, the proportional amplification, for example, for the cutting process, can be set higher since this no longer plays a part in the approach process. In particular, since the invention is also suitable to be implemented by means of a computer program product, the invention can also be retrofitted by simple means in existing cutting apparatuses, for example, with regard to laser cutting, specifically in particular if an already existing hardware can be further used. This proves to be particularly advantageous also for the transition from the approaching to the actual cutting process at a pre-determinable time point. Firstly, a good sensor-guided approach and secondly a greater amplification than was previously possible can be achieved, whereby an improved control quality can result.

According to a development, it is proposed that, in order to determine the first timespan, the cutting head is moved according to a pre-determined movement profile and the distance signal of the distance sensor is evaluated accordingly. A pre-determined movement profile can be, for example, a periodic movement profile, for example, according to a sine or cosine function or the like. By means of such a special measuring pass, which can be undertaken, for example, during a commissioning or at further planned testing or servicing time points, it can be determined with what time offset the distance sensor reacts to the predetermined movement or change in the distance. Thereby, the first timespan can be determined easily and reliably. The first timespan typically amounts to a few milliseconds. Dependent upon the distance sensor, however, the timespan can also be larger or significantly smaller.

The determination of the first timespan can take place at a pre-determined time point. The pre-determined time point can be, for example, a commissioning or a start of a cutting process. Furthermore, the pre-determined time point can also be during the cutting process, for example, in order to be able to detect changes of the first timespan during the intended operation, for example, during the cutting process and thus to be able to track the function according to the invention also during the intended cutting process. Thereby, the travel guidance and the control system can be further improved.

The determination of the control signal dependent upon the distance control signal comprises a limitation of the distance control signal. It can thereby be achieved that, in particular, during an approach process, mechanical properties, for example, in relation to the drive unit, the movement of the material or the movement of the cutting head and/or the like, can be better taken into account. In particular, the stability of the travel guidance according to the invention can thereby be improved.

Furthermore, according to a development, it is proposed that the method is used for an approach of the cutting head into a pre-determined start position. Preferably, the method is used only for the approach. Thereby, the conventional distance control can be further used for the actual cutting process. During the approach, the cutting head itself does not need to be activated. Rather, it is sufficient if the cutting head is activated only on reaching the start position. The start position is a position at which the cutting head is positioned for the beginning of the actual cutting process. With the beginning of the actual cutting process, it is then possible to switch over to the conventional distance control. The actual cutting process relates to a making of a pre-determined cut in the material, wherein the cut can have an almost arbitrary course, for example, straight, curved, angular, combinations thereof or the like. Preferably, the cut is uninterrupted, in particular, continuous. The start position can be an absolute position of the cutting head or a relative position of the cutting head relative to the material.

Particularly advantageously, it can be provided that the method is used only in a pre-determined timespan and/or path portion. This can involve a timespan or path portion in which the cutting head is deactivated, that is, no actual cutting process is carried out. Apart from the approach to the start position, this can, for example, also be a new positioning of the cutting head for a new cut after completion of the making of the first cut.

According to a development, it is proposed that a change-over takes place between the determination of the distance control signal using the delayed actual location signal and the determination of the distance control signal according to a conventional distance control. This enables specific advantages of the respective travel guidance for the guidance of the cutting head to be used dependent upon the respective operating mode. Thus, for example, a time point for the change-over can be provided. However, it can also be provided that the change-over takes place at a particular pre-determined position. Combinations thereof can also be provided.

Furthermore, it is proposed that the determination of the setpoint location signal from the position setpoint value comprises that the setpoint location signal is delayed relative to the position setpoint value by a pre-determined second timespan. In this way, the travel guidance overall can be further improved. The delay can be realized, for example, with a timing element or the like. However, it can also be achieved by means of the computer unit which can realize a corresponding time delay.

A development provides that the determination of the control signal comprises the determination of the control signal dependent upon a temporal change in the setpoint location signal. The temporal change to the setpoint location signal can be determined, for example, by means of a differentiator or the like. Furthermore, the possibility exists that the temporal change is determined and realized in the context of the axis control. This can also be realized both through separate hardware and also through suitable program code portions of the computer program.

The stated advantages and effects for the method according to the invention naturally apply equally also for the control facility according to the invention and the computer program product according to the invention and vice versa. In this respect, apparatus features can also be formulated for method features and vice versa.

BRIEF DESCRIPTION OF THE DRAWING

Further advantages and features are disclosed by the description of an exemplary embodiment on the basis of the accompanying drawings. In the figures, the same reference signs denote the same features and functions. In the drawings.

DETAILED DESCRIPTION OF PREFERRED EMBODIMENTS

Figure 1:
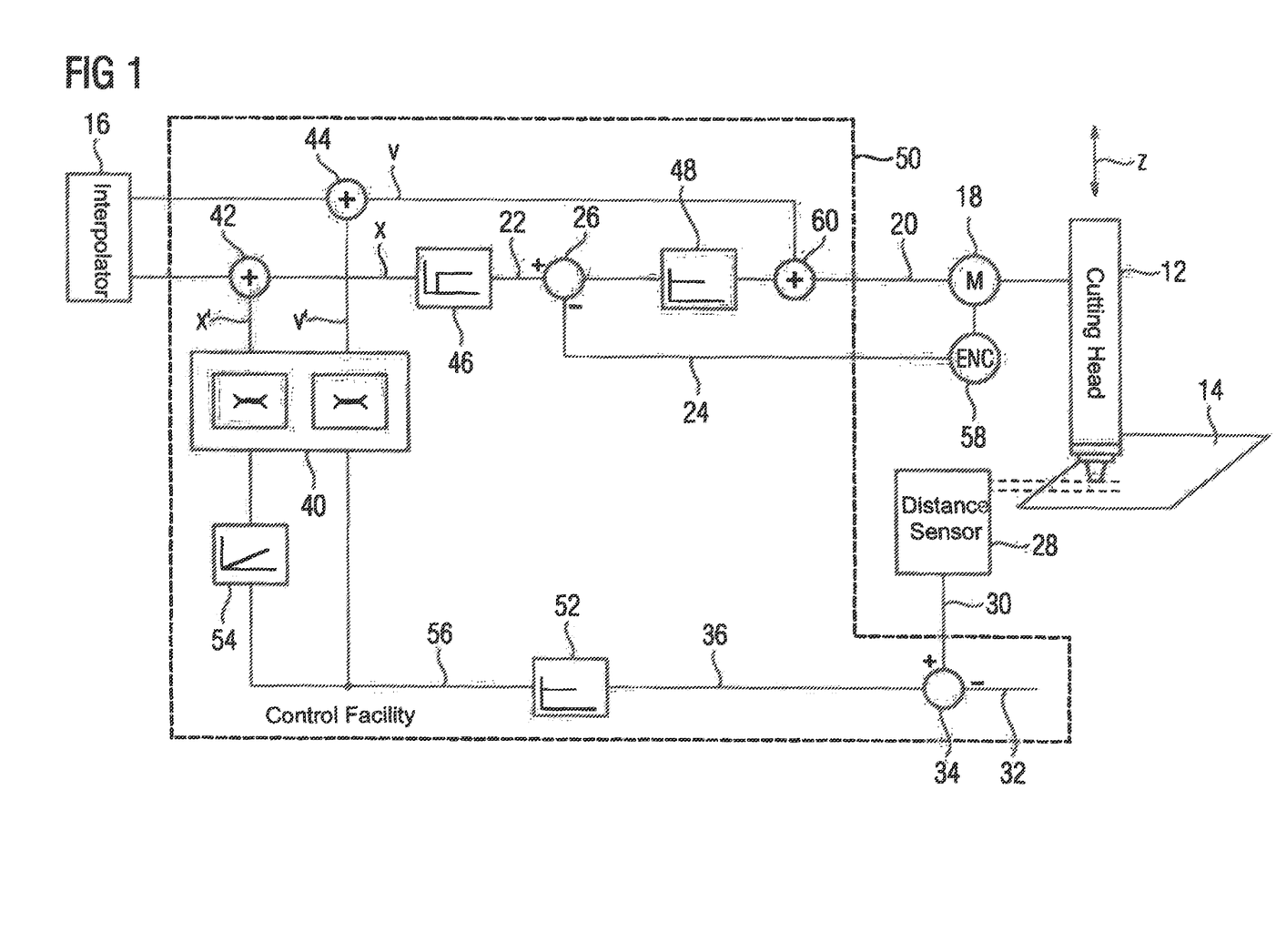
FIG. 1 is a schematic diagram of a guidance of a cutting head relative to a material with a distance controller.

FIG. 1 shows, in a schematic diagrammatic representation, a control facility 50 which serves to make a cut in a metal sheet 14 as the material for performing a cutting process on the basis of a relative movement of a laser cutting head 12 in relation to the metal sheet 14. For this purpose, it is provided herein that the metal sheet 14 is arranged fixed in a pre-determined receiving apparatus, so that the cutting process can be carried out in a pre-determined manner. As the cutting process, a laser cutting process is herein provided. In principle, however, a different cutting process can also be provided, for example, a water jet cutting process, a burner cutting process or the like.

The laser cutting head 12 is driven by means of a drive unit 18 in order to carry out the cutting process and also an approach procedure of the laser cutting head 12 to the metal sheet 14. In particular, the laser cutting head 12 can be moved by means of the drive unit 18 in a z-direction which is substantially orthogonal to a cutting region on the metal sheet 14. For this purpose, the drive unit 18 has an electric machine (not shown), by means of which the desired drive functionality for the laser cutting head 12 can be provided. Furthermore, the drive unit 18 can also comprise a transmission, an energy converter such as, for example, an inverter with which the electric machine can be driven in the intended manner and/or the like. These units are, however, not shown in the drawings. The metal sheet 14 is arranged fixed in relation to the laser cutting head 12.

The drive unit 18 further comprises a position sensor 58 as the motor encoder by means of which an actual location signal 24, which corresponds, for example, to a position actual value is provided, which is dependent upon an actual momentary position of the drive unit 18. In the present case, this position relates, in particular, to the z-direction.

A capacitive distance sensor 28 which provides a distance signal 30 is also connected to the control facility 50. The distance sensor 28 makes the distance signal 30 available with a specific delay time which herein amounts to a few milliseconds. The delay time of the distance sensor 28 is a component-specific reaction time which is determined substantially by the distance sensor 28, in particular, by means of its design and substantially cannot be influenced by the travel guidance.

The control facility 50 further uses a position setpoint value x and a speed setpoint value v, which are provided by an interpolator unit 16 for guiding the laser-cutting head 12. The process of cutting is to be carried out on the basis of these signals which provide the relevant values for the position setpoint value x and the speed setpoint value v. The interpolator unit 16 therefore serves, inter alia, to provide sequences of position setpoint values x and speed setpoint values v for the cutting process. The control facility 10 uses these values in order to provide a control signal 20 or an actuation signal for the drive unit 18, so that the laser cutting head 12 can be guided in a pre-determinable manner.

The control facility 50 is herein formed by a computer unit which comprises a computer program product which has a program for the computer unit with program code portions of the program for carrying out the steps of the method described below when the program is carried out by the computer unit, so that the computer unit determines and provides the control signal 20.

The control facility 50 is configured to provide the control signal 20 for the drive unit 18 dependent upon the position setpoint value x and on the speed setpoint value v to order to set the position and the speed of the laser cutting head 12 in relation to the metal sheet 14, in particular, to relation to a cutting plane. For this purpose, the control facility 10 is further configured to determine from the position setpoint value x a setpoint location signal 22 which corresponds, for example, to a position setpoint value. For this purpose, it is provided that by means of a delay member 46, the setpoint location signal 22 is delayed in relation to the position setpoint value x by a pre-determined timespan that is not further defined. This timespan can possibly be adapted for a respective travel guidance.

The actual location signal 24 provided by the drive unit 18 by means of the position sensor 58 is compared in the context of the first comparison with the setpoint location signal 22, wherein the first comparison is formed by a difference generator 26. The comparison provides in the present case that the actual location signal 24 is subtracted from the setpoint location signal 22. The control signal 20 for the drive unit 18 is provided dependent upon the first comparison to that the comparison result of the difference generator 26 is amplified by a pre-determined factor by means of an amplifier 48 or a proportional member or a proportional controller. To determine the control signal 20, the amplified signal is then overlaid on the speed setpoint value v by means of a superimposing unit 60, in the present case by addition. By this means, an axis control with regard to the movement of the laser cutting head 12 in the z-direction is provided and in the present case is a tool direction of the cutting head. For any other movement directions of the laser cutting head 12, corresponding controls can be provided.

For the intended operation for realizing the cutting process, it is important that a pre-determined distance between the laser cutting head 12 and the metal sheet 14 is maintained as exactly as possible. This does not need to be provided by the interpolator unit 16. For this purpose, by means of a separate signal, a comparison distance 32 or a setpoint distance is specified which can be selected dependent upon each cutting process that is to be carried out. This comparison distance 32 can be firmly set. In addition, however, it can also be varied as needed. The comparison distance can be provided by a separate unit. However, it can also be provided by the control facility 50 itself.

By means of the distance sensor 28, a distance between the laser cutting head 12 and the material 14 is detected and the corresponding distance signal 30 is provided. The distance signal 30 is then compared with the pre-determined comparison distance 32 in the context of a second comparison. For this purpose, by means of a difference generator 34, a difference between the distance signal 30 and the comparison distance 32 is determined and is provided as the difference signal 36. The difference signal 36 can correspond to a distance difference. It is provided herein that the comparison distance 32 is subtracted from the distance signal 30.

By means of an amplifier 52 and/or a proportional member or a proportional controller, the difference signal 36 is amplified in a pre-determinable manner and provided as a distance control signal 56. The distance control signal 56 therefore serves, in the present case, as an actuation signal for the distance controller. The distance control signal 56 is fed into a first branch via a limiter unit 40, whereby a limited signal v' is provided which herein forms an additional setpoint value for the speed. The limited signal v' is overlaid by means of a superimposing unit 44 on the speed setpoint value v, which herein is also formed by an addition.

In addition, the distance control signal 56 is next fed in a further branch to an integrator 54 and the integrated signal is then also fed to the limiter unit 40 which provides a signal x' which herein forms an additional setpoint value for the position. The signal x' is overlaid by means of a superimposing unit 42 on the position setpoint value x, which herein is formed by an addition.

However, the control facility 50 proves to be disadvantageous in that the approach procedure can be carried out only at a limited speed since, due to the overlaid control processes, an overshoot is to be expected. It is thereby also required to limit amplification factors, in particular, that of the amplifier 52. Finally, special conditions in relation to stability problems are also to be observed.

Figure 2:
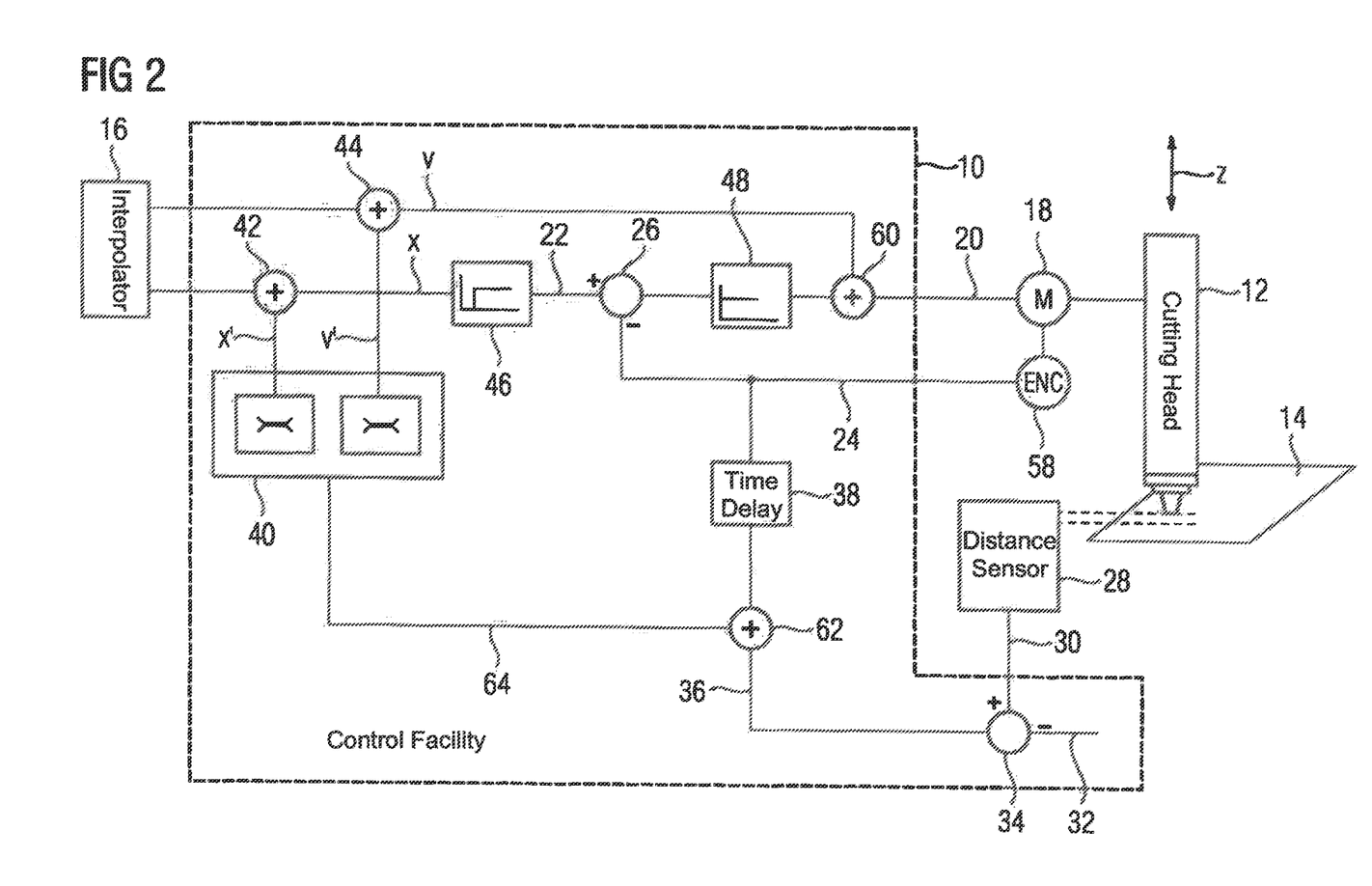
FIG. 2 is a schematic diagram similar to FIG. 1, wherein a distance controller is replaced by a determination of an absolute material location.

With a control facility 10 according to FIG. 2, these problems can be largely reduced. The control facility 10 according to FIG. 2 is based upon the control facility 50 according to FIG. 1, for which reason only the differences are described below. With regard to the further features and functions, reference is made to the description relating to FIG. 1.

The control facility 10 differs from the control facility 50 in that the difference signal 36 is overlaid with the actual location signal 24 delayed by a pre-determined first timespan. For this purpose, a superimposing unit 62 is provided which adds these two signals to provide a distance control signal 64. The first timespan is realized by a time delay element 38, which can be realized by means of a hardware circuit. However, if the control facility 10 is at least partially formed by a computer program, a corresponding computer functionality can be provided herein.

The first timespan is selected to be dependent upon the delay time of the distance sensor 28. In the present case, the first timespan corresponds to the delay time of the distance sensor 28. This involves a delay firm which the capacitive distance sensor 28 requires to provide the corresponding distance signal 30 for a detected distance. Thus a signal is available which corresponds to an absolute position of the metal sheet 14 as a distance control signal 64 as the result of the overlaying by the superimposing unit 62. The distance control signal 64 is then provided directly on the limiting unit 40 which provides the limited signals x' and v'. The further functions correspond to those functions described in relation to FIG. 1.

By means of the amended structure of the control facility 10 in relation to the control facility 50, it is now no longer necessary to provide the amplifier 52. The integrator 54 can also be omitted. The interleaved control according to FIG. 1 is thus transferred into a quasi-controlled single control system. By this means, not only is the stability of the control significantly improved, but it is possible to carry out, in particular, approach processes significantly accelerated. In addition, the overshoot occurring with the control facility 50 according to FIG. 1 can also be largely prevented, so that safety during the intended operation can be further improved.

In that substantially no additional new hardware components need to be required as compared with the control facility 50, the control facility 10 is suitable, in particular, also for retrofitting in already existing cutting apparatuses.

Depending upon the need, it can also be provided that the first timespan is adapted in pre-determinable timespans, for example, if the delay time of the capacitive distance sensor 28 changes dependent upon operational state and age. Thereby, a reliable intended functionality can also be provided during the intended operation of the cutting apparatus. The quality of the cutting result can thereby be kept substantially constant over both operational ranges of the cutting apparatus.

However, the invention is not limited to the use of capacitive distance sensors. Naturally, in place of the capacitive distance sensor, another distance sensor can also be provided which is, for example, optically, electrically or, in particular, magnetically, or inductively based, or the like.

Particularly advantageously, it can naturally be provided that a plurality of, for example, different distance sensors are used and for the different distance sensors, correspondingly assigned first timespans are determined which can then be separately compared with the actual location signal 24. By this means, the functionality of the invention can be further improved if the material properties of the material being cut change and, for example, a capacitive distance sensor is not suitable for determining the distance, but for example, switching over to an inductive distance sensor or the like is necessary. In this way, the flexibility of the invention can be further improved.

The invention is naturally not limited to the cutting head 12 being moved relative to the material 14. A dual embodiment is naturally also conceivable in which the material 14 is moved relative to the cutting head 12. Combinations thereof can also be provided without departing from the concept of the invention.

Finally, the invention can naturally also be combined with a conventional distance control. Preferably, a change-over can take place at pre-determined time points and/or positions.

The exemplary embodiment serves merely to describe the invention and is not intended to limit it.

What is claimed is:

1. A method for guiding a cutting head in relation to a material, said method comprising:
   providing with an interpolator unit a position setpoint value and a speed setpoint value for guiding the cutting head;
   determining from the position setpoint value a setpoint location signal, comparing in a first comparison an actual location signal provided by a drive unit with the setpoint location signal;
   setting with the drive unit a position and a speed of the cutting head in relation to the material dependent upon the position setpoint value and the speed setpoint value;
   detecting with a distance sensor a distance between the cutting head and the material and providing a distance signal;
   in a second comparison, subtracting a pre-determined comparison distance from the distance signal to generate a difference signal and superposing the difference signal on the actual location signal which is delayed by a first timespan and determining therefrom a limited distance control signal, wherein the first timespan is dependent upon a delay time of the distance sensor required by the distance sensor to provide the corresponding distance signal for a detected distance,
   determining a control signal for the drive unit dependent upon the first comparison, the speed setpoint value and the limited distance control signal, and
   cutting the material by moving the cutting head relative to the material commensurate with the determined control signal.

2. The method of claim 1, further comprising, for determining the first timespan, moving the cutting head commensurate with a pre-determined movement profile and evaluating the distance signal of the distance sensor accordingly.

3. The method of claim 1, wherein the first timespan is determined at a pre-determined time point.

4. The method of claim 1, further comprising moving the cutting head into a pre-determined start position.

5. The method of claim 1, wherein the distance control signal is alternatingly determined by using the delayed actual location signal and by using a conventional distance control signal without a time delay.

6. The method of claim 1, wherein the control signal is determined by a temporal change in the setpoint location signal dependent upon the first comparison.

7. The method of claim 1, wherein determining the setpoint location signal from the position setpoint value further comprises delaying the setpoint location signal being relative to the position setpoint value by a pre-determined second timespan.

8. A computer program product embodied in a computer-readable non-transitory medium and comprising program code which when loaded into a memory of a processor of a control facility, which guides a cutting head in relation to a material in order to make a cut in the material by means of a cutting process carried out by the cutting head due to a relative movement of the cutting head in relation to the material, and executed by the processor, causes the control facility to
   provide with an interpolator unit a position setpoint value and a speed setpoint value for guiding the cutting head, determine from the position setpoint value a setpoint location signal, compare in a first comparison an actual location signal provided by a drive unit with the setpoint location signal, set with the drive unit a position and a speed of the cutting head in relation to the material dependent upon the position setpoint value and the speed setpoint value, detect with a distance sensor a distance between the cutting head and the material and providing a distance signal, in a second comparison, subtract a pre-determined comparison distance from the distance signal to generate a difference signal and superpose the difference signal on the actual location signal which is delayed by a first timespan and determine therefrom a limited distance control signal, wherein the first timespan is dependent upon a delay time of the distance sensor required by the distance sensor to provide the corresponding distance signal for a detected distance, determine a control signal for the drive unit dependent upon the first comparison, the speed setpoint value and the limited distance control signal, and cut the material by moving the cutting head relative to the material commensurate with the determined control signal.

9. A control facility for guiding a cutting head in relation to a material in order to make a cut in the material by means of a cutting process carried out by the cutting head due to a relative movement of the cutting head in relation to the material, the control facility comprising:

a first input receiving from an interpolator unit a position setpoint value and a speed setpoint value for guiding the cutting head, a second input receiving from a distance sensor a distance signal indicating a distance between the cutting head and the material, an output supplying to a drive unit a position and a speed of the cutting head in relation to the material based on a control signal which depends on the position setpoint value and the speed setpoint value, for which purpose the control facility is configured to, determine from the position setpoint value a setpoint location signal, compare in a first comparison an actual location signal provided by a drive unit with the setpoint location signal, set with the drive unit the position and the speed of the cutting head, provide a distance signal based on the detected distance between the cutting head and the material, in a second comparison, subtract a pre-determined comparison distance from the distance signal to generate a difference signal and superpose the difference signal on the actual location signal which is delayed by a first timespan and determining therefrom a limited distance control signal, wherein the first timespan is dependent upon a delay time of the distance sensor required by the distance sensor to provide the corresponding distance signal for a detected distance between the cutting head and the material, determine a control signal for the drive unit dependent upon the first comparison, the speed setpoint value and the limited distance control signal, and cut the material by moving the cutting head relative to the material commensurate with the determined control signal.

* * * * *